United States Patent [19]

Malen

[11] Patent Number: 4,581,192
[45] Date of Patent: Apr. 8, 1986

[54] EMPIRICAL METHOD FOR DETERMINING THE SHAPE OF A VEHICLE BODY MEMBRANE PANEL

[75] Inventor: Donald E. Malen, Lathrup Village, Mich.

[73] Assignee: General Motors Corporation, Detroit, Mich.

[21] Appl. No.: 619,624

[22] Filed: Jun. 11, 1984

[51] Int. Cl.⁴ .............................................. B29C 51/00
[52] U.S. Cl. ................................... 264/322; 264/164; 264/219; 264/291
[58] Field of Search .................. 72/342, 364, 379; 76/107 R; 264/164, 230, 291, 292, 322, 219, 220

[56] References Cited

U.S. PATENT DOCUMENTS

| | | | |
|---|---|---|---|
| 2,448,492 | 8/1948 | Mayne | 264/291 |
| 2,700,007 | 1/1955 | Dennison et al. | 264/291 |
| 3,340,101 | 9/1967 | Fields, Jr. et al. | 72/364 |
| 3,487,133 | 12/1969 | Lindsay | 264/291 |
| 4,117,068 | 9/1978 | Miller | 264/322 |

*Primary Examiner*—Lowell A. Larson
*Attorney, Agent, or Firm*—Herbert Furman

[57] ABSTRACT

The shape of a non-axisymmetric vehicle body membrane panel is determined by placing a sheet of material over a scaled opening in a frame or support; constraining the edge portion of the sheet of material around the opening; heating the support and material to an elevated temperature above the glass transition temperature of the material until the modulus of elasticity of the material is relatively low and non-existent and the material has only membrane stresses which lie solely in the plane of the material and are constant over thickness. The unconstrained portion of the material within the opening deforms to the desired membrane shape so that this shape can be transferred to a die when the deformed material is thereafter cooled.

4 Claims, 11 Drawing Figures (A)

(B)

EMPIRICAL METHOD FOR DETERMINING THE SHAPE OF A VEHICLE BODY MEMBRANE PANEL

This invention relates generally to an empirical method for determining the shape of a vehicle body membrane panel and more particularly to an empirical method for determining the geometric definition of a load reacting non-axisymmetric vehicle body membrane panel.

A vehicle body includes various structural systems for reacting to applied loads without excessive deflection. Such systems include beam systems, membrane systems, truss systems and shell systems. The most widely used system in a vehicle body is a beam system because such a system permits wide packaging flexibility, in other words, the least possible constraints on the structural skeleton of the body to permit wide latitude in selecting various body and passenger configurations. However, the wide packaging flexibility results in a reduction in structural efficiency and an increase in mass and cost.

Membrane systems have a higher structural efficiency than beam systems under non-uniform stress loads but are relatively inflexible in permitting wide latitude in body packaging as compared to beam systems. This is true since a membrane panel normally requires a specific surface and boundary which can react only to loads tangent to the surface. The panel cannot react to transverse bending moments or transverse shear forces. All known mathematical equations which are solvable in closed form for defining a membrane system under an applied load assume that the membrane has an axisymmetric surface and boundary and that all stresses applied to the membrane lie in a plane tangent to the membrane system at the point of application. Since it is virtually impossible to provide load reacting vehicle body panels which are axisymmetric in surface and boundary, membrane panels have not been used in certain vehicle body applications, such as floor pans.

This invention provides an empirical method for determining the shape of a membrane panel having a non-axisymmetric surface and boundary and intended for use primarily in vehicle body applications. The membrane panel accepts and reacts to various types of loads, both local and distributed, and directed both normal and angular to its surface. The method must be empirical since no solvable mathematic definition of such a general membrane panel is known.

In the preferred embodiment of the invention, a frame or support is provided with an opening which defines the desired non-axisymmetric boundary of the vehicle body panel. The opening may be full scale or reduced scale, such as ⅜ scale. A sheet of polyvinyl chloride plastic material covers the opening and has its periphery secured to the support around the opening. The plastic material and support are then heated, such as in a convection oven, above the glass transition temperature to an elevated temperature at which the plastic sheet loses all internal bending stresses and has only membrane stresses, stresses that lie solely in the plane of the sheets and are constant over the thickness. As the sheet is heated above the glass transition temperature to the elevated temperature, it deforms within the opening to the desired membrane shape. This shape is dependent solely on externally applied loads, or loading due to gravity acting upon the sheet, and the boundary or edge of the opening. The modulus of elasticity of the material drops from a relatively high number at room temperature to a relatively low number once the material has been heated to the elevated temperature above the glass transition temperature. The high modulus of elasticity indicates high bending stresses.

If the body panel is not required to react to point applied loads, such as a body rear floor pan or body front floor pan, then no loads other than loads due to gravity are applied to the sheet of plastic material as the sheet is heated through the glass transition temperature to the elevated temperature. If the body panel is required to react to point applied loads, such as a body front or rear wheel house panel providing a securement for a MacPherson or similar type of strut, then the sheet of material is subjected to a localized scaled load as it is being heated to the elevated temperature above the glass transition temperature.

After the sheet of plastic material is heated through the glass transition temperature to the elevated temperature so that it deforms within the opening to the desired membrane shape, the sheet is cooled while remaining constrained to the support and under the influence of any applied localized load or the load of gravity so that the deformed sheet of material keeps its resultant membrane shape. Thereafter, the resultant shape of the sheet can be transformed in any known manner to a die so that sheets of metal, such as steel, aluminum, or sheets of other material can be subsequently formed to the resultant membrane shape for use as body panels in production vehicle bodies.

To date the method has been successfully performed with sheets of PVC heated through their glass transition temperature, 70° C., to an elevated temperature, such as 75°–170° C. However, the method is applicable to sheets of other high polymer thermoplastic materials, such as acrylics, which have (1) a high modulus of elasticity at room temperature, 20° C., and essentially zero or low modulus of elasticity when heated through their glass transition temperature to an elevated temperature; (2) substantially constant stress values as strain values increase when heated to the elevated temperature above their glass transition temperature; and (3) stress values that correlate with temperature.

The primary object of this invention is to provide an empirical method for determining the shape of a load reacting non-axisymmetric vehicle body membrane panel. Another object is to provide such a method which will determine the shape of a vehicle body panel capable of reacting to various types of loads without requiring that the panel be axisymmetric or include any ribs or other surface indentations for load carrying purposes. A further object is to provide such a method which can be used to determine the shape of such panel which will react to localized loads which are either constant over the surface or which peak at irregular intervals over the surface.

The foregoing objects will be further apparent from the following specification and drawings wherein.

Figure 5:
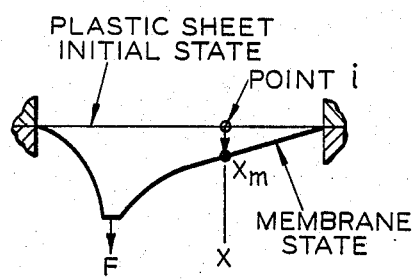
Figure 5:
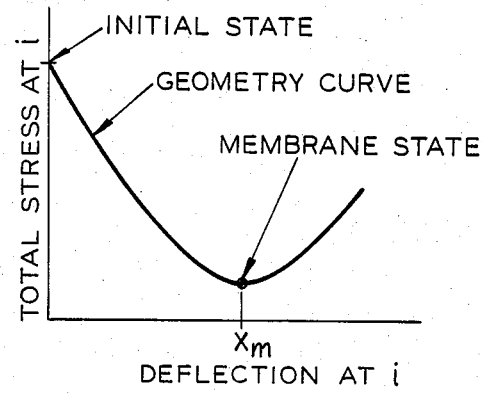

FIGS. 5(A) and 5(B) are a schematic and a graph.

FIG. 6 is a graph.

Figure 7:
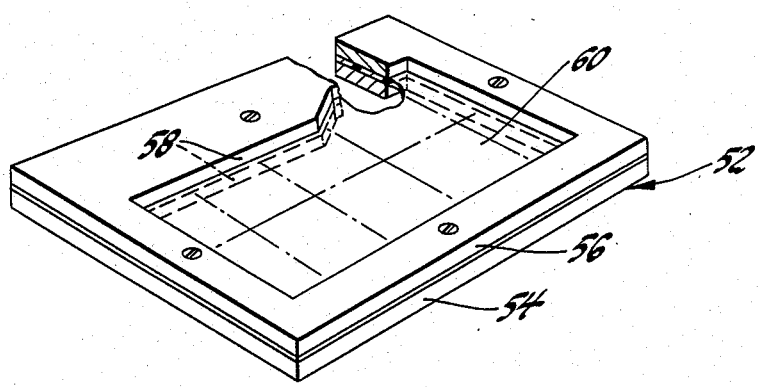

FIG. 7 is a perspective broken away view of a step in the method of this invention for determining the shape of a panel which reacts to a distributed load.

Figure 8:
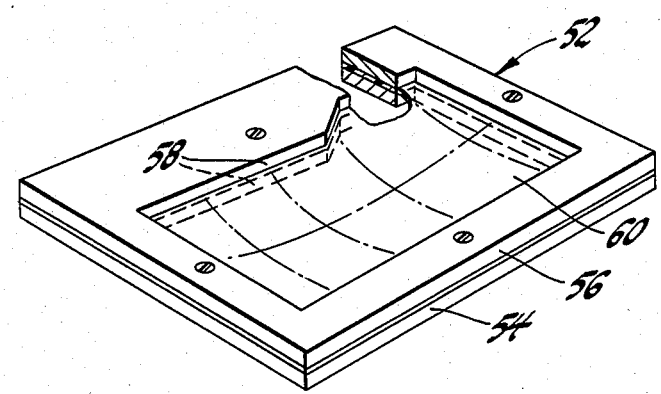

FIG. 8 is a view of the step subsequent to FIG. 7.

Figure 9:
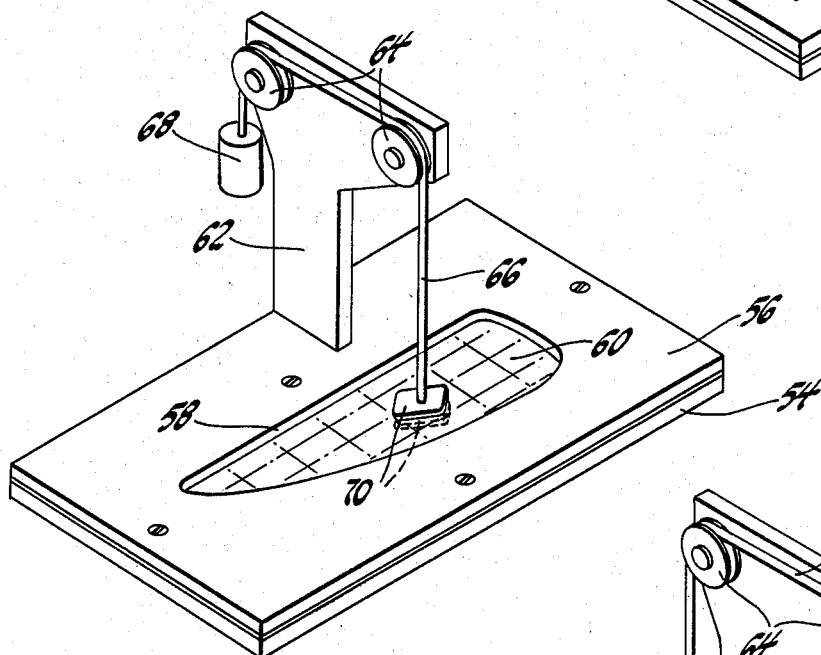
Figure 10:
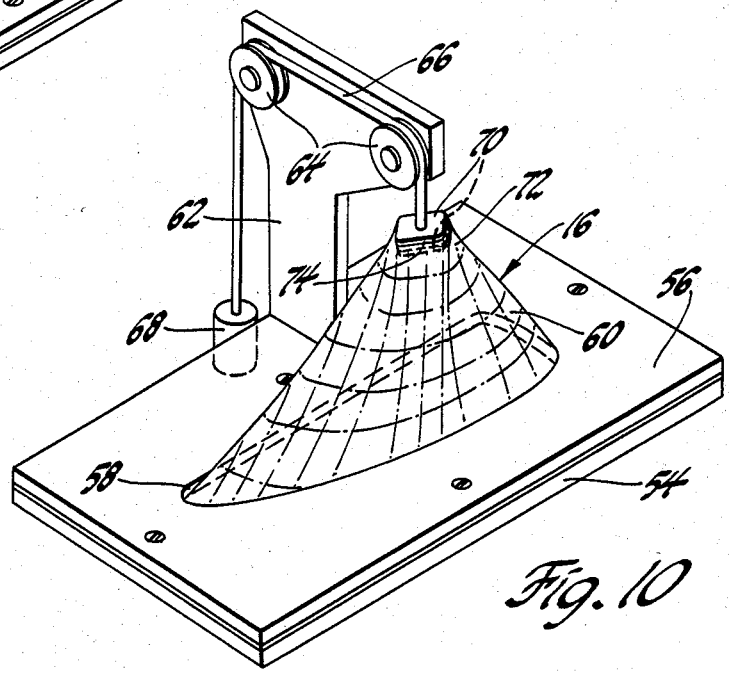

FIG. 9 is a perspective view of a step in the method of this invention for determining the shape of a panel which reacts to localized loads, and FIG. 10 is a perspective view of a step subsequent to the step of FIG. 9.

Figure 1:
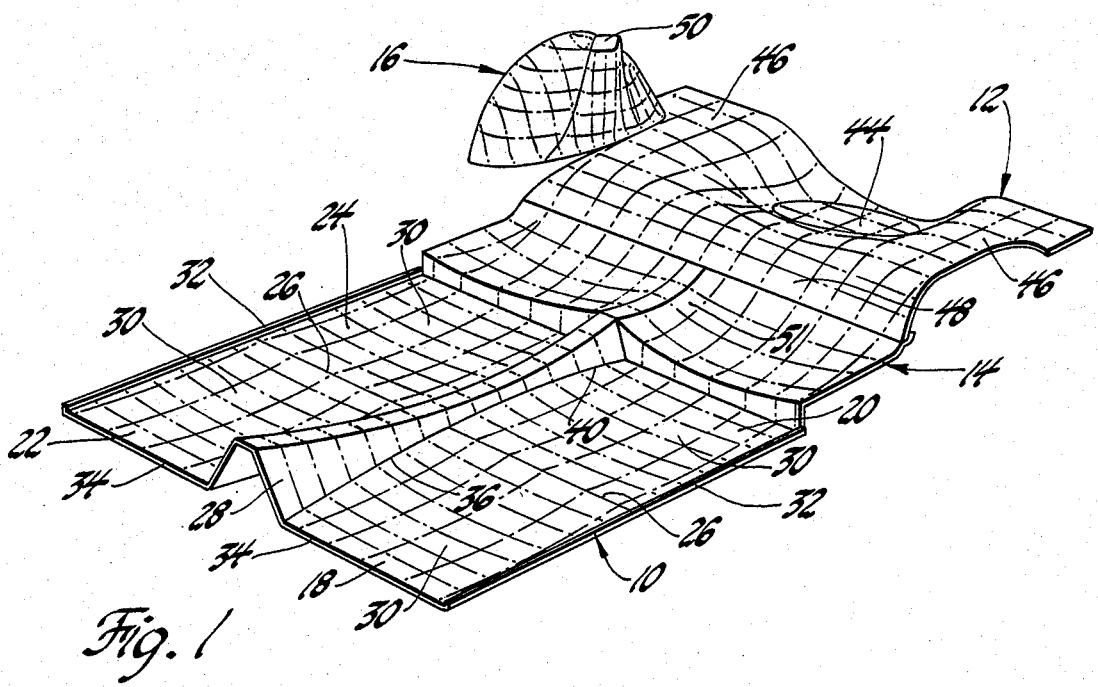
FIG. 1 is a perspective view of various vehicle body membrane panels which can be determined according to the method of this invention.

Referring now particularly to FIG. 1 of the drawings, a number of vehicle body membrane panels which can be determined according to the method of this invention includes a floor pan assembly 10, a rear compartment pan 12, a rear seat pan 14 and a rear wheel house 16. These panels are illustrative of the panels whose shape can be determined according to the method of this invention.

Figure 2:
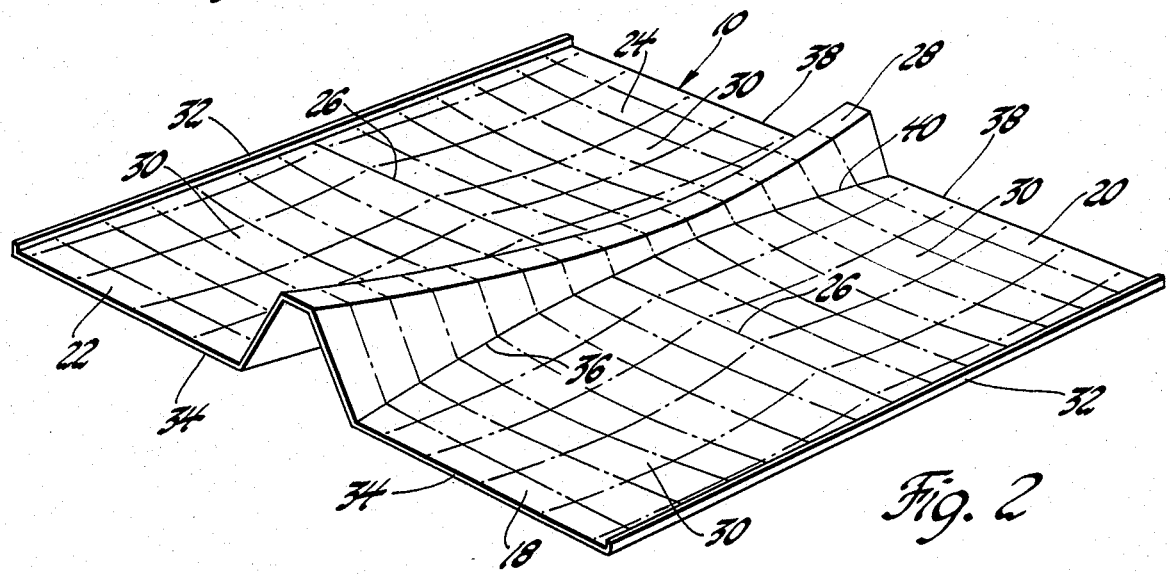
FIG. 2 is an enlarged perspective view of the floor pan assembly of FIG. 1.

As shown in FIG. 2, the floor pan assembly 10 includes a left hand unit having front and rear floor pan sections 18 and 20 and a right hand unit having front and rear floor pan sections 22 and 24. The sections 18 and 20 of the left hand unit and the sections 22 and 24 of the right hand unit are each integrally connected by a linear juncture 26. Additionally, the right hand and left hand units are integrally connected by a tunnel 28. Although the floor pan assembly is shown as an integral module of sections 18 through 24 and tunnel 28, it will be appreciated that the sections may be formed individually and welded or otherwise secured to each other and to the tunnel. Likewise, the units may be integrally formed and welded or otherwise secured to the tunnel. Each section 18, 20, 22 and 24 is a load reacting non-axisymmetric membrane panel 30 of crown or shallow dish shape. Therefore, each section is incapable of transmitting transverse bending moments or transverse shear forces and can accept only stresses which lie in a plane tangent to the surface thereof. Each of the sections does not require ribs or surface indentations for strength purposes. Dash lines have been added to show the cross-section contours thereof. The boundary of each of the sections 18 and 22 includes an outer flanged linear side edge 32, a linear forward edge 34, a linear rear edge defined by the juncture 26, and an inner side edge 36 which is generally curvilinear. The boundary of each of the sections 20 and 24 includes the edges 26 and 32, a linear rear edge 38, and an inner side edge 40 which is curvilinear and asymmetric to edge 36 since tunnel 28 is a catenary.

Since the membrane panels 30 are non-axisymmetric, they cannot be defined by conventional solvable equations which can only be used for symmetric membrane panels or catenaries.

Figure 3:
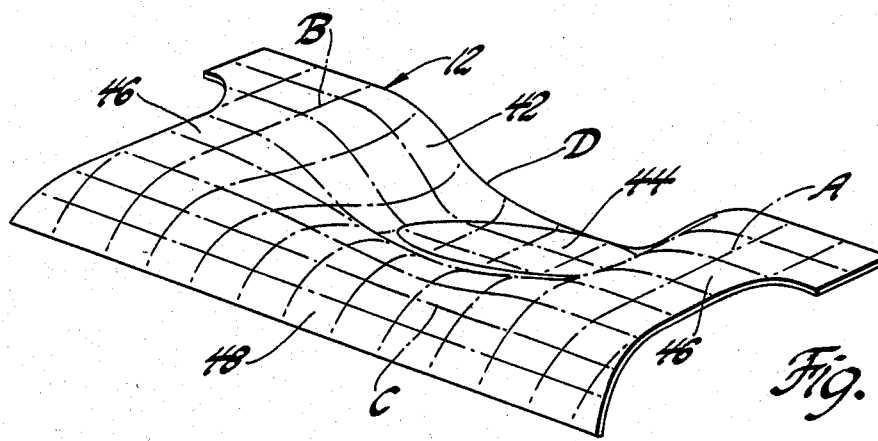
FIG. 3 is an enlarged perspective view of a portion of the rear compartment pan of FIG. 1.

Referring now to FIG. 3 of the drawings, the rear compartment pan 12 is likewise a load reacting non-axisymmetric membrane panel and cannot be defined by conventional solvable equations. Pan 12 includes a crown or dish shape portion 42 having a planar integral bottom wall 44 to provide for spare tire storage. The rear compartment pan 12, like the floor pan assembly 10, does not require ribs or surface indentations for strength purposes. Dash lines have been added to FIG. 3 to show the cross-sectional contours thereof. The side portions 46 of the pan 12 are planar and the forward portion 48 is arcuate. These portions would be determined other than by the method of this invention.

Figure 4:
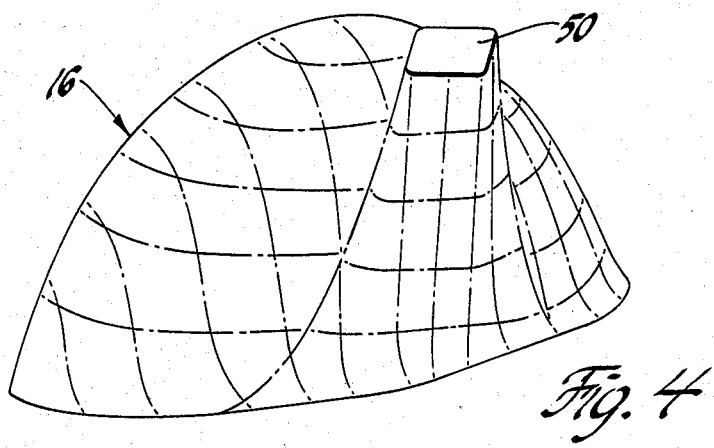
FIG. 4 is an enlarged view of the rear wheel house of FIG. 1.

The rear wheel house 16 shown in FIG. 4 is also a non-axisymmetric membrane panel and further includes an integral shock tower 50 which must react to point or localized area loading. The dash lines indicate the cross-sectional contours of the wheel house.

Although not shown in enlarged form, the rear seat pan 14 is comprised of a pair of membrane panels integrally joined by a curvilinear tunnel member 51, FIG. 1. The forward and inboard side edges of the panels are curvilinear while the outboard side and rear edges of the panels are linear. The rear edges are secured to the forward linear edge of the forward portion 48 of pan 12. The contour of the panels of pan 14 is similar to that of the sections of the floor pan assembly 10. The panels of pan 14 may be formed individually and secured to tunnel member 51 or formed integrally therewith.

The method of this invention allows the geometric definition of a non-axisymmetric load reacting vehicle body membrane panel. In its preferred embodiment, the method includes the use of polyvinylchloride sheet material, commonly known as PVC, which deforms into an opening in a frame or support. The opening is a scaled representation of the boundary of the membrane panel, either full scale or partial scale, and the sheet of PVC is constrained about the opening and free or unconstrained within the confines of the opening. When the sheet is heated, such as in a convection oven, to an elevated temperature above its glass transition temperature, the sheet deforms within the opening to a specific geometric shape dependent on the action of gravity applied loads, if any, and the boundary shape or edge of the opening. The geometric shape assumed by the sheet is the desired shape of the non-axisymmetric membrane panel.

PVC has the material properties necessary for the method of this invention. These material properties include a very low or substantially non-existent modulus of elasticity when heated to an elevated temperature above the glass transition temperature of the material; stress values that are essentially constant over strain at elevated temperatures; and stress values which are dependent upon temperature.

The low or substantially non-existent modulus of elasticity at the elevated temperature indicates that the material has lost all internal bending stresses and thus lacks forces trying to restore the sheet to its shape at room temperature. This shape may be planar or otherwise as will be explained, at room temperature. Also, this indicates that any stresses that do remain are membrane stresses which lie solely in the plane of the material and are substantially constant over the thickness of the material. The substantially constant stress values at the elevated temperature indicate that there is sufficient stress over the thickness of the material to have the material deform to the desired geometric definition or membrane shape without tearing of the material. By having stress values which are dependent upon temperature, the deformation of the material can be controlled and the elevated temperature can be selected.

Although the method to date has been successfully carried out only with PVC, it is believed apparent from the foregoing discussion that other high polymer thermoplastic materials, such as acrylics, having similar material properties as PVC, can also be successfully used.

Referring now to FIG. 5(A), there is very little, if any, measurable deflection X at point i on the unconstrained portion of the plastic sheet in its initial state at room temperature. As indicated by the geometry curve of FIG. 5(B), the total stress at point i in the initial state is relatively high while measurable deflection is generally non-existent.

As the plastic sheet is heated to the elevated temperature above the glass transition temperature, the unconstrained portion of the sheet reaches its membrane state, FIG. 5(A), and there is measurable deflection $X_m$ at point i. As indicated by the geometry curve of FIG. 5(B), the total stress at point i is at a minimum at the membrane state. If the unconstrained portion of the sheath is heated past the membrane state, the geometry curve starts to increase to indicate that the bending stresses are increasing. Of course, if the heating continues, tearing of the material will eventually occur.

Figure 6:
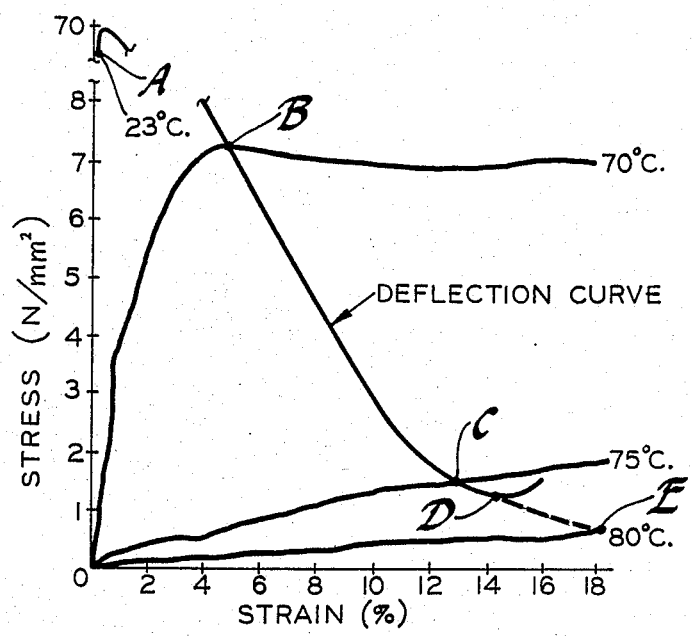

FIG. 6 is a graph of various stress-strain curves at various temperatures for PVC sheet material. Superimposed on the stress-strain curves is a deflection curve indicating deflection from horizontal of a point on a sheet of PVC. Intersection point A indicates that at room temperature, 23° C., bending stresses are balanced by elastic stresses and the material has a high modulus of elasticity. Therefore, strain is minor. As the material is heated through and above the glass transition temperature, 70° C., strain increases rapidly to balance the reduced bending stresses, as evidenced by intersection points B and C. At point D, the deflection curve reches a minimum. This indicates that the sheet of PVC material is at a membrane state where it has deformed to the desired membrane shape and only membrane stresses are present. Thus, if the sheet of material used to carry out the method of this invention is PVC, it would be heated to a temperature of approximately 75° C. The dash line continuation of the deflection curve to intersection point E indicates that the membrane shape would be lost and that tearing will occur if the PVC material is heated above 80° C. since strain rapidly increases.

Although FIG. 6 is based on PVC, it is indicative of other high polymer plastic materials.

FIG. 7 of the drawings shows the formation of a membrane panel which must react to a distributed load. A frame or support 52 is formed of rectangular sheets of wood or other rigid material and includes a lower frame member 54 and an upper frame member 56 having abutting upper and lower surfaces, respectively, and like shaped aligned openings 58 therein. The edges of openings 58 are a scaled representation of the boundary or edge of the desired membrane panel. The openings 58 in the members 54 and 56 are clearly non-axisymmetric and are an example of the boundary or edge of a vehicle body membrane panel which can be determined according to this invention.

If the membrane panel being determined is one of the sections of the floor pan assembly 10 of FIG. 2, such as section 18 or 22, the opening 58 would have the shape of the edges 26, 36, 34 and 32, without the flange. It will also be noted that these edges are not coplanar. Therefore, the abutting surfaces of the frame members, around openings 58, would be shaped so that the edge of the opening defines a scaled representation of the edge of the membrane panel.

If the rear compartment pan 12 were to be formed, the openings 58 would have the shape defined by lines A, B, C and D in FIG. 3. These boundary lines are not coplanar and abutting surfaces of the frame member would be accordingly shaped around the cutouts 58.

A sheet 60 of PVC plastic material is clamped between the frame members 54 and 56 over the opening 58 of member 54 and under the opening 58 of member 56. The members 54 and 56 are releasably secured to each other, such as by screws as shown, or clamps. Thus, the edge portion of the sheet 60 is constrained against any movement while the portion of the sheet 60 within the openings is unconstrained.

As shown in FIG. 8, once the frame and the sheet of material are heated to the elevated temperature of 70° C., the sheet of material deforms under the action of gravity within the opening 58 of the lower frame member 54 to the desired non-axisymmetric shape of the membrane panel. Thereafter the frame members and the sheet are removed from the convection oven, the sheet of material cooled and the shape thereof transferred in any known conventional manner, such as by Numerically Controlled Milling equipment, to suitable male and female die members. Such die members can thereafter be used to stamp a membrane panel of metal for use in the vehicle body. If any flanges are desired on the membrane panel, suitable provisions can be made to form such flanges in the dies.

FIGS. 9 and 10 show the formation of a membrane panel which must react to localized or point applied loads, such as the rear wheel house 16 having a shock tower 50, shown in FIG. 4.

In an instance such as this, an extension 62 is added to the upper frame member 56 adjacent the opening 58 therein. A pair of pulleys 64 are conventionally pivotally mounted to the extension 62. A cable 66 extends over the pulleys with one end of the cable having secured thereto a weight 68 and the other end of the cable having secured thereto a pair of washers 70 which clamp the sheet 60 of plastic material therebetween. It will be noted that the opening 58 in the frame member 56 is of different shape than the opening 58 shown in FIGS. 7 and 8 and approximates the shape of a wheel house membrane panel. When the frame members and plastic material are heated to the elevated temperature, the weight applied to the sheet of plastic material 60 by the weight 68 forms the sheet as shown in FIG. 10 so that the sheet includes a localized area 72 which would have a generally planar upper wall 74 between the washers 70. The overall area of this planar wall is determined by the size of the washers. The localized area 72 is representative of the shock tower 50 of the rear wheel house 26 shown in FIG. 4.

The manner in which the weight 68 on the end of the cable 66 is determined in order to make a scale model of the rear wheel house 16 will now be described.

$$\frac{Fm}{\alpha m(T)\,(1m)^2} = \frac{Fp}{\alpha p(1p)^2}$$

where:
Fm = required load on sheet of material model
Fp = peak shock load to be applied to production part
lm = scale of model
lp = scale of production part
αm(T) = stress level in model (controlled by oven temperature)
αp = desired peak stress level in production part
Solving for Fm, $$Fm = Fp \frac{\alpha m(T)}{\alpha p} \left(\frac{lm}{lp}\right)^2$$

Example for shock tower 50;
Fp=16,000 N (peak shock load)
lm=$\frac{3}{8}$ (model scale)
lp=1
αm(150C)=0.1 N/mm² (oven controlled model stress)
αp=100 N/mm² (desired peak stress)

$$Fm = 16000 \left(\frac{.1}{100}\right) \left(\frac{3}{8}\right)^2$$

$$= 2.25N$$

lm/lp takes into account the relative scale of the model to the relative scale of the part to be formed by the die made from the model. Normally lm/lp will be less than 1 inasmuch as the scale of the model can be easily converted into a full scale die. By making a smaller size model, a smaller size convection oven can be used and there are also economies in material and fuel. The factor αm will vary from 7 N/mm² to 0.07 N/mm² and is a design factor which varies.

Thus this invention provides an empirical method for determining a geometric definition of a load reacting nonaxisymmetric vehicle body membrane panel.

The embodiments of the invention in which an exclusive property or privilege is claimed are defined as follows:

1. An empirical method of determining the shape of a load reacting non-axisymmetric membrane panel comprising,
    placing a planar sheet of material over an opening which is a scaled representation of the boundary of the non-axisymmetric membrane panel,
    the material, when heated to a temperature above the transition temperature, having the property of losing substantially all internal bending stresses and having only membrane stresses which are constant over thickness so as to exhibit substantially constant stress values as strain values increase,
    constraining the sheet of material around the opening so that only the portion of the sheet within the opening is unconstrained,
    heating the sheet of material to the temperature above the transition temperature whereby the unconstrained portion of the sheet of material deforms into the opening under gravity and assumes a scaled representation of the desired shape of the load reacting non-axisymmetric membrane panel, and cooling the deformed sheet of material.

2. The method recited in claim 1 wherein the sheet of material is constrained by clamping the sheet about its periphery to a frame having an opening which is a scaled representation of the boundary of the membrane panel.

3. The method recited in claim 1 wherein the planar sheet of material is a high polymer plastic material of the group including polyvinylchloride and acrylics.

4. An empirical method of forming a load reacting non-axisymmetric membrane panel which is required to react to localized point applied loads comprising,
    constraining a high polymer plastic material around an opening which is a scaled representation of the boundary of the non-axisymmetric membrane panel of metal,
    subjecting the plastic material to a localized scale load,
    heating the plastic material above the transition temperature to a temperature at which the plastic material has only membrane stresses and exhibits substantially constant stress values as strain values increase,
    the unconstrained portion of the sheet of plastic material deforming under gravity and under the localized scaled load within the opening and assuming a scaled representation of the shape of the non-axisymmetric membrane panel, and
    cooling the deformed sheet of plastic material.

* * * * *